(12) United States Patent
Sugai et al.

(10) Patent No.: US 11,936,829 B2
(45) Date of Patent: Mar. 19, 2024

(54) ILLUMINATING DEVICE, IMAGE READING DEVICE, AND IMAGE FORMING APPARATUS WITH MULTIPLE LIGHT SOURCES

(71) Applicants: Atsushi Sugai, Kanagawa (JP); Masamoto Nakazawa, Kanagawa (JP); Masahiro Itoh, Kanagawa (JP)

(72) Inventors: Atsushi Sugai, Kanagawa (JP); Masamoto Nakazawa, Kanagawa (JP); Masahiro Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/792,536

(22) PCT Filed: Mar. 22, 2021

(86) PCT No.: PCT/IB2021/052350
§ 371 (c)(1),
(2) Date: Jul. 13, 2022

(87) PCT Pub. No.: WO2021/191765
PCT Pub. Date: Sep. 30, 2021

(65) Prior Publication Data
US 2023/0007140 A1    Jan. 5, 2023

(30) Foreign Application Priority Data
Mar. 26, 2020  (JP) ................ 2020-056146

(51) Int. Cl.
*H04N 1/028* (2006.01)
*F21S 4/28* (2016.01)
(Continued)

(52) U.S. Cl.
CPC ............ *H04N 1/0288* (2013.01); *F21S 4/28* (2016.01); *H04N 1/23* (2013.01); *F21Y 2105/16* (2016.08);
(Continued)

(58) Field of Classification Search
None
See application file for complete search history.

(56) References Cited

U.S. PATENT DOCUMENTS

2006/0163355 A1    7/2006  Olmstead et al.
2006/0279961 A1    12/2006 Sakurai
(Continued)

FOREIGN PATENT DOCUMENTS

JP    2004-006227       1/2004
JP    2004303578 A     10/2004
(Continued)

OTHER PUBLICATIONS

English translation of JP-2012056123-A. (Year: 2012).*
(Continued)

*Primary Examiner* — Thomas D Lee
(74) *Attorney, Agent, or Firm* — Harness, Dickey & Pierce, P.L.C.

(57) ABSTRACT

An illuminating device, an image reading device, and an image forming apparatus. The illuminating device includes a plurality of first light sources arrayed on a circuit board, the first light sources having a plurality of first light emitting surfaces through which light is emitted, and a second light source disposed on an upstream side of the first light sources in an irradiation direction of the light. In the illuminating device, the second light source has a second light emitting surface through which light is emitted, and the second light source has a directivity angle different from a directivity angle of each one of the first light sources. The image
(Continued)

reading device includes the illuminating device, and an imaging device to receive the light reflected by a document to capture an image of the document.

14 Claims, 9 Drawing Sheets

(51) Int. Cl.
*H04N 1/23* (2006.01)
*F21Y 105/16* (2016.01)
*F21Y 113/10* (2016.01)
*F21Y 115/10* (2016.01)

(52) U.S. Cl.
CPC ........ *F21Y 2113/10* (2016.08); *F21Y 2115/10* (2016.08); *H04N 2201/0081* (2013.01)

(56) References Cited

U.S. PATENT DOCUMENTS

| | | | |
|---|---|---|---|
| 2012/0300271 A1* | 11/2012 | Ishida | G02B 6/0046 358/475 |
| 2013/0293932 A1 | 11/2013 | Sugai et al. | |
| 2014/0071501 A1 | 3/2014 | Shinkawa et al. | |
| 2014/0078560 A1 | 3/2014 | Nagao et al. | |
| 2015/0131173 A1 | 5/2015 | Sugai et al. | |
| 2015/0358496 A1 | 12/2015 | Depalov et al. | |
| 2015/0365553 A1 | 12/2015 | Sugai et al. | |
| 2017/0118363 A1 | 4/2017 | Sugai | |

FOREIGN PATENT DOCUMENTS

| | | | |
|---|---|---|---|
| JP | 2006349807 A | | 12/2006 |
| JP | 2008304675 A | | 12/2008 |
| JP | 2009037073 A | | 2/2009 |
| JP | 2010178070 A | | 8/2010 |
| JP | 2012056123 A | * | 3/2012 |
| JP | 2012-073496 | | 4/2012 |
| JP | 2013-118523 | | 6/2013 |
| JP | 2014-192806 | | 10/2014 |
| JP | 2018-050182 A | | 3/2018 |
| JP | 2019-184741 | | 10/2019 |
| WO | WO1989/000299 A1 | | 1/1989 |

OTHER PUBLICATIONS

International Search Report dated Jun. 25, 2021 in PCT/IB2021/052350 filed on Mar. 22, 2021.
Japanese Office Action, dated Nov. 17, 2023, issued in corresponding Japanese Patent Application No. 2020-056146.
Chinese Office Action dated Oct. 31, 2023 for corresponding Chinese Patent Application No. CN202180022209.6,.

* cited by examiner

ILLUMINATING DEVICE, IMAGE READING DEVICE, AND IMAGE FORMING APPARATUS WITH MULTIPLE LIGHT SOURCES

CROSS-REFERENCE TO RELATED APPLICATIONS

This application is a national phase under 35 U.S.C. § 371 of PCT International Application No. PCT/IB2021/052350 which has an International filing date of Mar. 22, 2021, which claims priority to Japanese Application No. 2020-056146, filed Mar. 26, 2020, the entire contents of each of which are hereby incorporated by reference

TECHNICAL FIELD

Embodiments of the present disclosure relate to an illuminating device, an image reading device, and an image forming apparatus.

BACKGROUND ART

In the related art, an illuminating device is known that includes a plurality of first light sources arrayed on a circuit board and a plurality of second light sources disposed on an upstream side of the multiple first light sources in an irradiation direction of the light.

For example, the illuminating device is known in the art that includes a plurality of first light sources that are arrayed on a circuit board and emit white light and a plurality of second light sources that are arrayed on an upstream side of the multiple first light sources in an irradiation direction of the light and emit amber light (see, for example, PTL 1).

CITATION LIST

Patent Literature

[PTL 1]
Japanese Unexamined Patent Application Publication No. 2019-184741

SUMMARY OF INVENTION

Technical Problem

However, some of the image light that is emitted from the second light sources disposed on an upstream side of the multiple first light sources in an irradiation direction of the light is blocked by the multiple first light sources that are disposed on a downstream side in an irradiation direction of the light, and the utilization efficiency of light of the multiple second light sources tends to deteriorate.

Solution to Problem

The illuminating device includes a plurality of first light sources arrayed on a circuit board, the first light sources having a plurality of first light emitting surfaces through which light is emitted, and a second light source disposed on an upstream side of the first light sources in an irradiation direction of the light, the second light source having a second light emitting surface through which light is emitted. In the illuminating device, the second light source has a directivity angle different from a directivity angle of each one of the first light sources.

Advantageous Effects of Invention

According to one aspect of the present disclosure, the utilization efficiency of light of the multiple second light sources can be prevented from deteriorating.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

An electrophotographic copier according to an embodiment of the present disclosure that serves as an image forming apparatus is described below. Such a copier will be referred to as simply a copier 1 in the following description.

Figure 1:
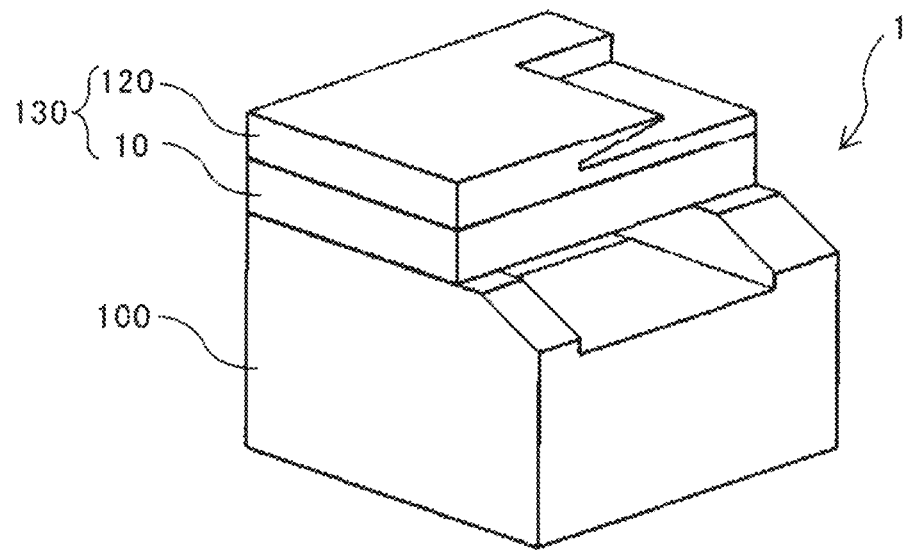
FIG. 1 is an external perspective view of the entire copier that serves as an image forming apparatus, according to an embodiment of the present disclosure.

FIG. 1 is an external perspective view of the entire copier 1 that serves as an image forming apparatus, according to the present embodiment.

The copier 1 according to the present embodiment includes a printer unit 100 that serves as image forming device, and the printer unit 100 is arranged approximately in the center of the main frame of the copier 1. Moreover, an image scanning unit 130 is disposed on the upper side of the printer unit 100, and the image scanning unit 130 is provided with a scanner unit 10 and an automatic document feeder (ADF) 120 that serves as a document conveyance unit.

Figure 2:
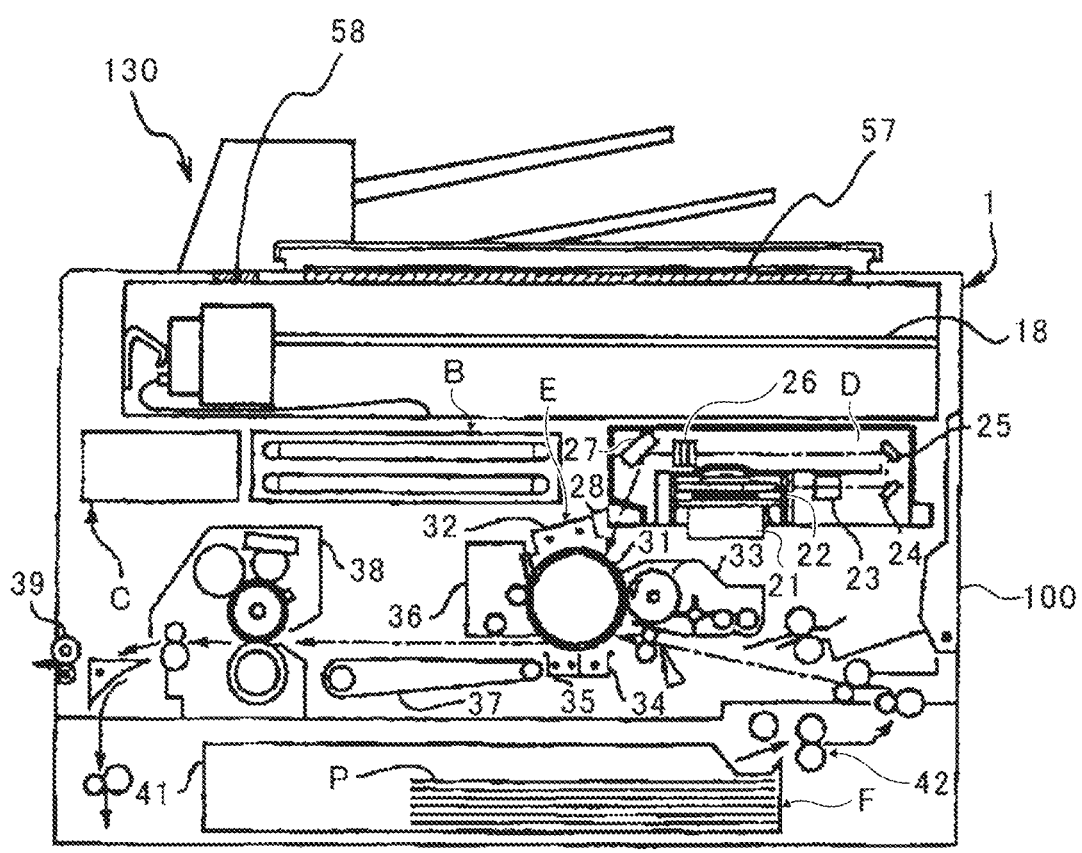
FIG. 2 is a diagram illustrating a schematic configuration of a copier according to an embodiment of the present disclosure.

FIG. 2 is a diagram illustrating a schematic configuration of the copier 1 according to the present embodiment.

The printer unit 100 includes, for example, an image processing unit B, an image memory C, an image drawing unit D, an image recording unit E, and a sheet feeder F.

The image recording unit E includes, for example, a photoconductor drum 31 that serves as a latent-image bearer as well as a charging device 32, a development device 33, a transfer unit 34, a separating unit 35, and a cleaning device 36 that are arranged around the photoconductor drum 31. On the downstream side of the separating unit 35, a conveyance unit 37, a fixing device 38, and a sheet ejection unit 39 are further arranged, and these elements, i.e., the conveyance unit 37, the fixing device 38, and the sheet ejection unit 39, are also included in the image recording unit E.

The sheet feeder F includes, for example, a sheet tray 41 in which transfer paper P that serves as a recording material is stored and a paper feed 42 that feed the transfer paper P stored in the sheet tray 41 in a separate manner.

The surface of the photoconductor drum 31 that is driven to rotate is evenly charged by the charging device 32. The modulated laser beam is scanned in the axial direction of the photoconductor drum 31 based on the data obtained as a result of image processing performed by the image processing unit B on the image data scanned by the image scanning unit 130, and emitted from the image drawing unit D to the surface of the electrically charged photoconductor drum 31.

As a result, an electrostatic latent image is formed on the photoconductor drum 31. An electrostatic latent image that is formed on the photoconductor drum 31 is developed in the developing area facing the developing device 33 as an electrically charged toner sticks to the electrostatic latent image. As a result, a toner image is formed. In accordance with the above processes, the transfer paper P is fed and conveyed by the sheet feeder F at a prescribed timing to a transferring area in which the photoconductor drum 31 and the transfer unit 34 face each other. Then, the transfer paper P is electrically charged by the transfer unit 34 with reversed polarity to the toner image on the photoconductor drum 31. As a result, the toner image that is formed on the photoconductor drum 31 is transferred onto the transfer paper P. Subsequently, the transfer paper P is separated from the photoconductor drum 31, and is conveyed to the fixing device 38 by the conveyance unit 37, and the toner image is fixed by the fixing device 38. After that, the transfer paper P is ejected to the outside of the apparatus by the sheet ejection unit 39. The surface of the photoconductor drum 31 from which the toner image has been transferred by the transfer unit 34 is cleaned by the cleaning device 36, and the toner that remains on the photoconductor drum 31 is removed.

The image processing unit B performs predetermined image processing on the image signal sent from the image scanning unit 130. The image processing that is performed by the image processing unit B includes, for example, shading correction, brightness-to-density conversion, EE processing, discrimination between character and dot, filtering, scaling, copying, gamma correction, writing density correction, two-beam control, error diffusion processes, and data compression processes. Then, the image data that has been processed by the image processing unit B is stored in the image memory C on a temporary basis. The image data that is stored in the image memory C on a temporary basis is output to the image drawing unit D. In the image drawing unit D, writing light is output from a semiconductor laser based on the received image data. The writing light that is emitted from a semiconductor laser is rotationally scanned by a polygon mirror 22 that is driven to rotate by a driving motor 21. The writing light that has rotationally been scanned passes through a fθ lens 23 first, and then passes through a first mirror 24, a second mirror 25, a cylindrical lens 26, and a third mirror 27. Further, the writing light is emitted through a cover glass 28, and the photoconductor drum 31 that is included in the image recording unit E is irradiated with the writing light.

Figure 3:
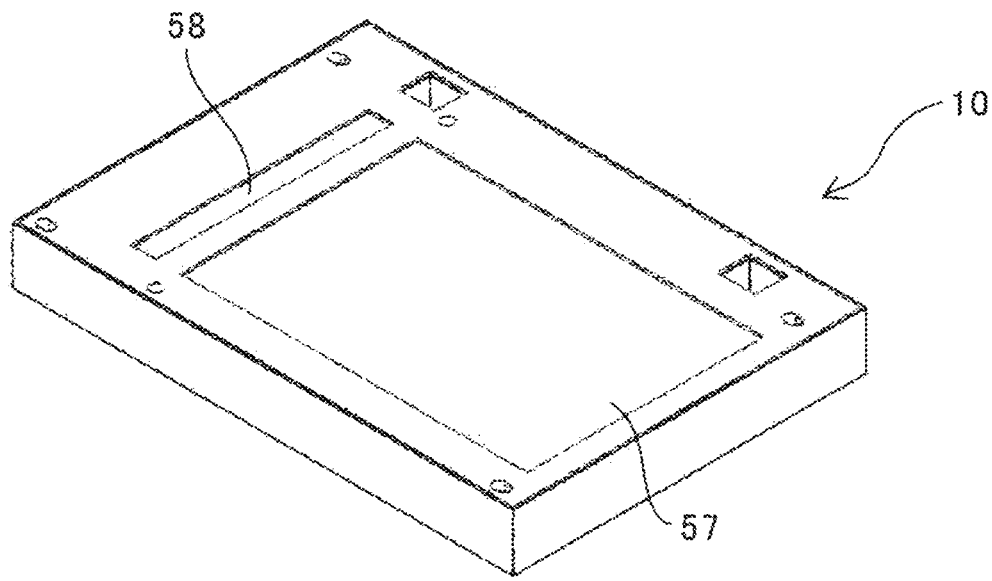
FIG. 3 is a perspective view of a scanner unit according to an embodiment of the present disclosure.

FIG. 3 is a perspective view of the scanner unit 10 according to the present embodiment of the present disclosure.

The automatic document feeder (ADF) 120 is mounted on the scanner unit 10. As the ADF 120 is supported by a hinge in a pivotable manner, the top surface of the scanner unit 10 can be exposed or closed. The scanner unit 10 are provided with a contact glass 57 and a slit glass 58, which serve as a pair of transparent members, on the top surface.

Figure 4:
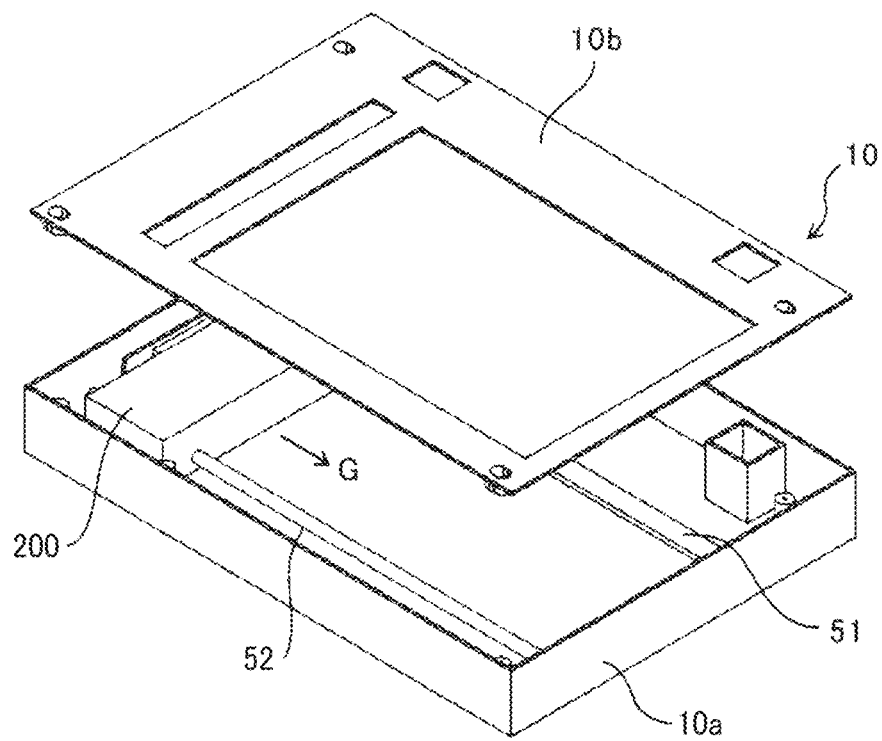
FIG. 4 is a perspective view of the inside of a scanner unit according to an embodiment of the present disclosure.

FIG. 4 is a perspective view of the inside of the scanner unit 10 according to the present embodiment.

As illustrated in FIG. 4, the scanner unit 10 includes a housing 10a that is approximately cuboid-shaped like a box, and a scanner cover 10b attached to the housing 10a so as to close the top face of the housing 10a. The housing 10a stores, for example, an integral scanning unit 200. The integral scanning unit 200 is supported by a guide rod 52 and a guide rail 51 that are attached to the housing 10a in the right and left directions in FIG. 4, in a movable manner in the direction as indicated by an arrow G in FIG. 4.

Figure 5:
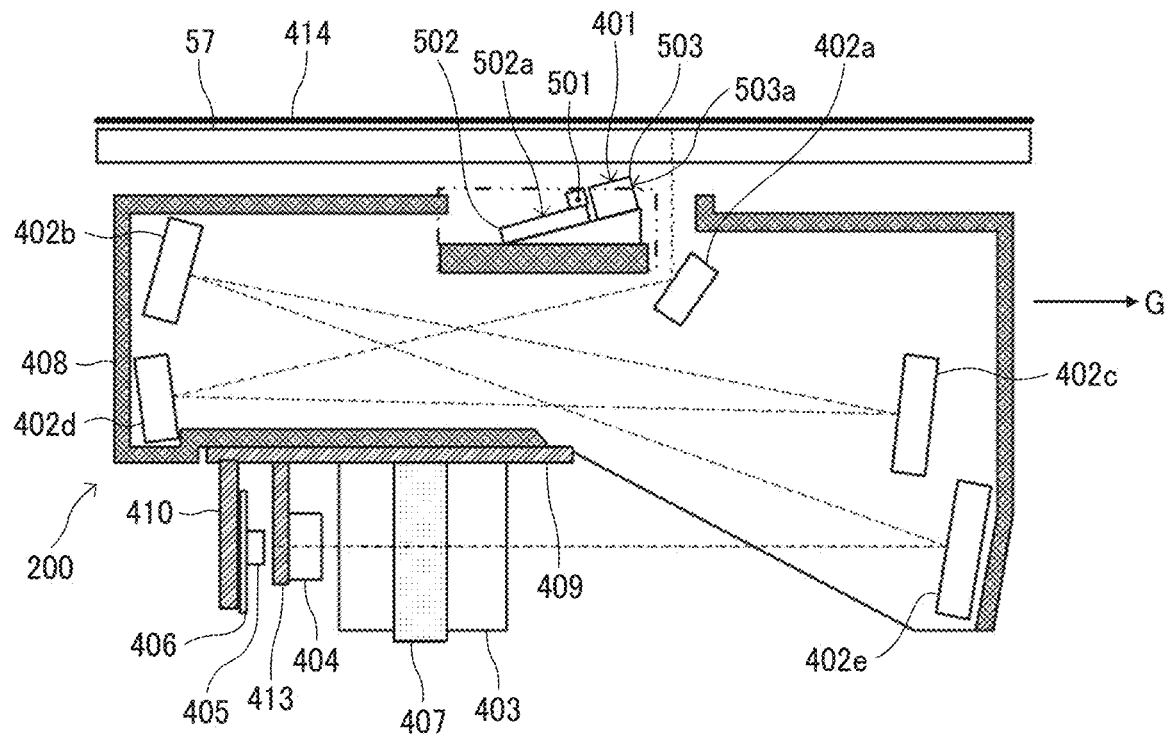
FIG. 5 is a diagram illustrating a schematic configuration of an integral scanning unit, according to an embodiment of the present disclosure.

FIG. 5 is a diagram illustrating a schematic configuration of the integral scanning unit 200, according to the present embodiment.

As illustrated in FIG. 5, the illuminating device 401 is stored in a frame 408 of the integral scanning unit 200. Moreover, five reflection mirrors 402a, 402b, 402c, 402d, and 402e that refract the light reflected by a document 414 that is an object whose image is to be captured, and a first lens group 403 and a second lens group 404 that form an image of the light reflected by these reflection minors 402a, 402b, 402c, 402d, and 402e are stored as elements of the integral scanning unit 200. Moreover, for example, an image sensor 405 that serves as an image sensing device to photoelectrically converts the light whose image is to be formed by the first lens group 403 and the second lens group 404, and a drive circuit board 406 that outputs an image signal based on an electrical signal output from the image sensor 405 to drive the image sensor 405 are stored as elements of the integral scanning unit 200.

The first lens group 403 that is arranged on the reflection mirror 402e side is fixed on the lens holder 409 through a lens band 407. The second lens group 404 that is arranged on the image sensor 405 side is attached to the lens holder 409 through a lens fixing bracket 413.

The first lens group 403 includes a plurality of lenses with positive optical power, and the second lens group 404 includes a plurality of lenses with negative optical power. In the present embodiment, the first lens group 403 that has positive optical power and the second lens group 404 that has negative optical power are arranged. Due to such a configuration, a chromatic aberration is corrected, and an image with a high degree of resolution can be formed on the image sensor 405. Moreover, the focal length can be shortened, and the size of the integral scanning unit 200 can be reduced. Further, the distance between the second lens group 404 and the image sensor 405, which is so-called the length of back focus, can be shortened, and the size of the integral scanning unit 200 can be reduced.

The drive circuit board 406 on which the image sensor 405 is mounted is attached to the lens holder 409 through a fixing bracket 410. The image sensor 405 may be, for example, a charge coupled device (CCD) or a complementary metal oxide semiconductor (CMOS). Note also that the image sensor 405 according to the present embodiment can capture an image of both an area of visible light and an area of infrared light.

The illuminating device 401 has a circuit board 502 where a plurality of white-point light sources 501 that emit white light are arrayed on an implementation surface 502a. Moreover, the illuminating device 401 has a light guide 503 that guides the lights that are emitted from the multiple white-point light sources 501 to an illumination area of the document. The light guide 503 according to the present embodiment is made of, for example, resin such as acrylic with high transparency, and has an exit plane 503a to which diffusing agent that serves as a diffuser is applied. When the light that is emitted from the multiple white-point light sources 501 exits from the exit plane 503a of the light guide 503, the light diverges. Accordingly, the variations in the illuminance or chromaticity of the light that is emitted to the document plane in the X-directions due to the variations in the illuminance or chromaticity of a plurality of point sources of light can effectively be reduced.

White light is emitted from the illuminating device 401 toward an object, i.e., the document plane of the document 414 placed on the contact glass 57. The light that is reflected by the document plane is reflected by the five reflection mirrors 402a, 402b, 402c, 402d, and 402e. The guided reflection light passes through the first lens group 403 and the second lens group 404, and is incident on the image sensor 405. As the reflection light is received by the image sensor 405, the image of the document is scanned and read.

As the integral scanning unit 200 moves in the direction as indicated by an arrow G in FIG. 5, the image on the document placed on the contact glass 57 is sequentially scanned by the image sensor 405. As a result, the entire image of the document is scanned.

The integral scanning unit 200 is moved to the home position in which the light that is emitted from the illuminating device 401 toward the slit glass 58 as illustrated in FIG. 4, and the image of the document on the document plane, which is conveyed by the ADF 120 that passes by over the slit glass 58, is sequentially scanned by the image sensor 405.

Figure 6:
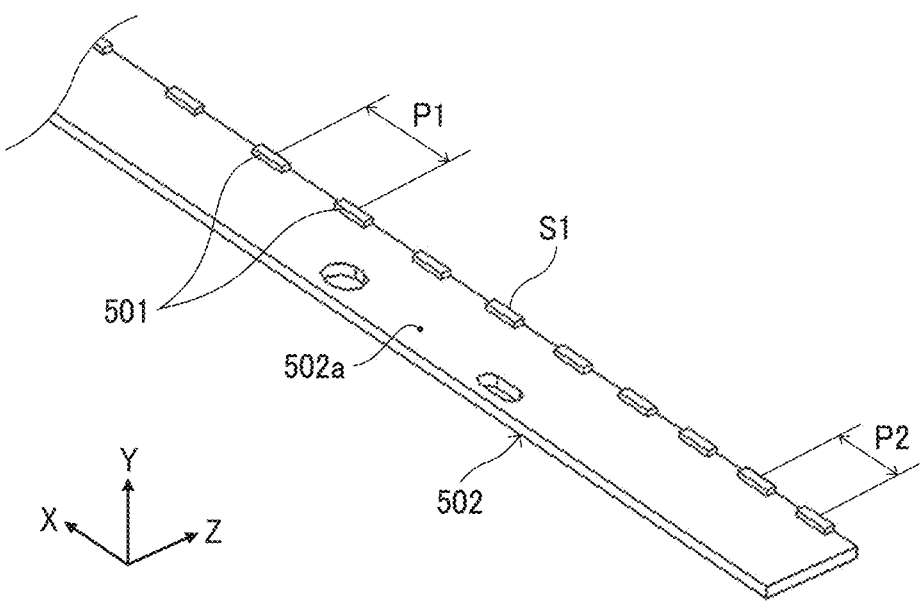
FIG. 6 is a diagram illustrating the pitches of a plurality of white-point light sources that are arrayed on the implementation surface of a circuit board, according to an embodiment of the present disclosure.

FIG. 6 is a diagram illustrating the pitches of the multiple white-point light sources 501 that are arrayed on the light-source mount surface 502a of the circuit board 502, according to the present embodiment.

In the following description of the present disclosure, the longer-side directions of the circuit board, i.e., the main scanning direction at a scanning position, is referred to as the X-direction, and the thickness directions of the circuit board is referred to as the Y-direction. Moreover, the irradiation direction of light by a point source of light is referred to as the Z-direction.

As illustrated in FIG. 6, the multiple white-point light sources 501 are arrayed in the X-direction. The multiple white-point light sources 501 are light-emitting diodes (LEDs) of side-view type, and a plurality of light emitting surfaces S1 are arranged on the same plane as the edge face of the circuit board 502 in a coplanar manner, and are orthogonal to the implementation surface 502a. The array pitch P2 of the multiple white-point light sources 501 on the edge side in the X-direction is made narrower than the array pitch P1 of the multiple white-point light sources 501 on the central side in the X-direction. Note that the array pitch indicates the distance in the X-direction between the center of one of the multiple white-point light sources 501, i.e., the center of light emission of one of the multiple point sources of light, and the center of neighboring one of the multiple white-point light sources 501.

Figure 7:
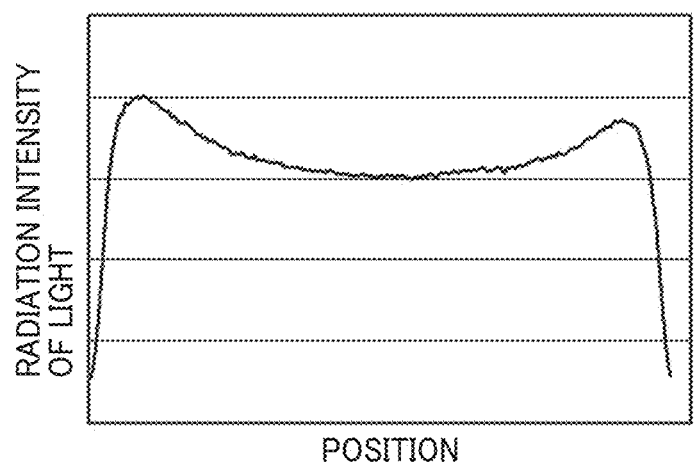
FIG. 7 is a diagram illustrating the distribution of radiation intensity of light at a scanning position in the main scanning direction, according to an embodiment of the present disclosure.

FIG. 7 is a diagram illustrating the distribution of radiation intensity of light at a scanning position (irradiation position) in the main scanning direction, i.e., the X-direction, according to an embodiment of the present disclosure.

As described above, in the present embodiment, the array pitch P2 of the multiple white-point light sources 501 on the edge side in the X-direction is made narrower than the array pitch P1 of the multiple white-point light sources 501 on the central side in the X-direction. Due to such a configuration, the radiation intensity of light on the edge side in the X-direction is greater than the radiation intensity of light on the central side.

When the light passes through the first lens group 403 and the second lens group 404, the radiation intensity of light decreases on the edge side of these lens groups in the X-direction. In order to avoid such a situation, the array pitch P2 of the multiple white-point light sources 501 on the edge side in the X-direction is made narrower than the array pitch P1 of the multiple white-point light sources 501 on the central side in the X-direction to increase the radiation intensity of light on the edge side in the X-direction to a degree greater than the radiation intensity on the central side. By so doing, the reduction in radiation intensity of light when the light passes through the first lens group 403 and the second lens group 404 can be compensated. Due to such a configuration, a reduction in radiation intensity of the light that is received by the image sensor 405 on the edge side in the X-direction compared with the central side can be controlled, and the image of the document plane on the edge side in the X-direction can be read as desired. Alternatively, the power of light emission of the multiple white-point light sources 501 on the edge side in the X-direction may be increased to a degree greater than the power of light emission of the multiple white-point light sources 501 on the central side. By so doing, the radiation intensity of light on the edge side in the X-direction may be increased to a degree greater than the radiation intensity on the central side.

Figure 8:
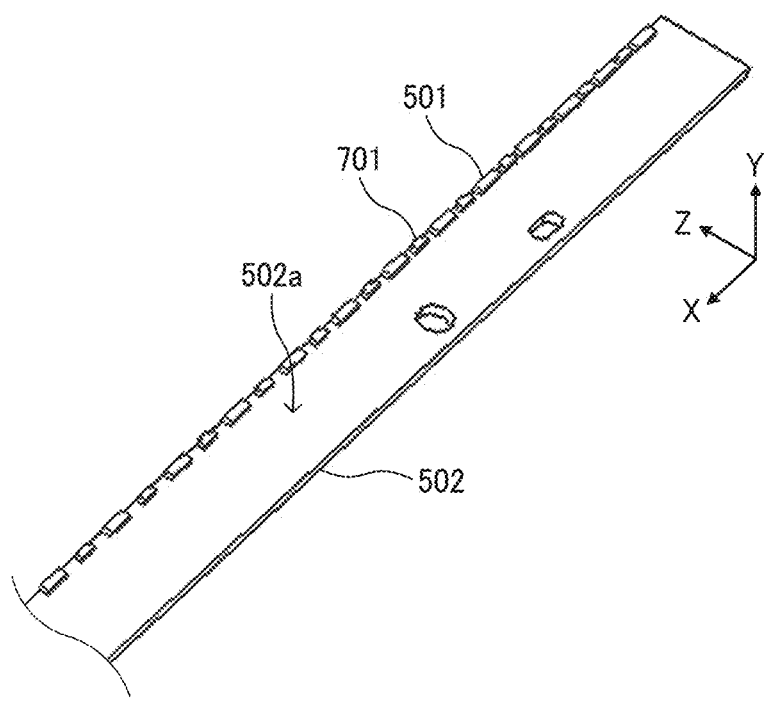
FIG. 8 is a perspective view of an irradiation device in which an infrared-light point source is disposed between each pair of a plurality of white-point light sources, according to an embodiment of the present disclosure.

FIG. 8 is a perspective view of an irradiation device in which the infrared-light point source 701 whose wavelength range is different from the multiple white-point light sources 501 is disposed between each pair of the multiple white-point light sources 501, according to the present embodiment.

As illustrated in FIG. 8, the infrared-light point source 701 is disposed between each pair of the multiple white-point light sources 501. The multiple infrared-light point sources 701 are also light-emitting diodes (LEDs) of side-view type, and are implemented on the circuit board 502 such that the light emitting surfaces will be orthogonal to the implementation surface 502a. As the infrared-light point source 701 is disposed between each pair of the multiple white-point light sources 501, the document image can be scanned and read by both white light and infrared light. For example, when the optical character recognition/optical character reader (OCR) is to be performed on a document image, infrared light is emitted to the document to read the image on the document. Due to the irradiation with infrared light, the colors on the document image can be ignored to improve the accuracy of character recognition.

Moreover, due to the irradiation with infrared light, an infrared (IR) image, which is made visible and readable when irradiated with infrared light, can be read. For example, an anticounterfeit IR image that is printed on, for example, various kinds of certificates or confidential papers is read by irradiation of infrared light, and copying is banned when an IR image is present. Due to such a configuration, forgery can be prevented. Alternatively, the IR image that is read by irradiation of infrared light may be printed using visible toner such as black toner to notify a user or other people that the document is a duplicate. Forgery prevention may be achieved in this manner.

Figure 9:
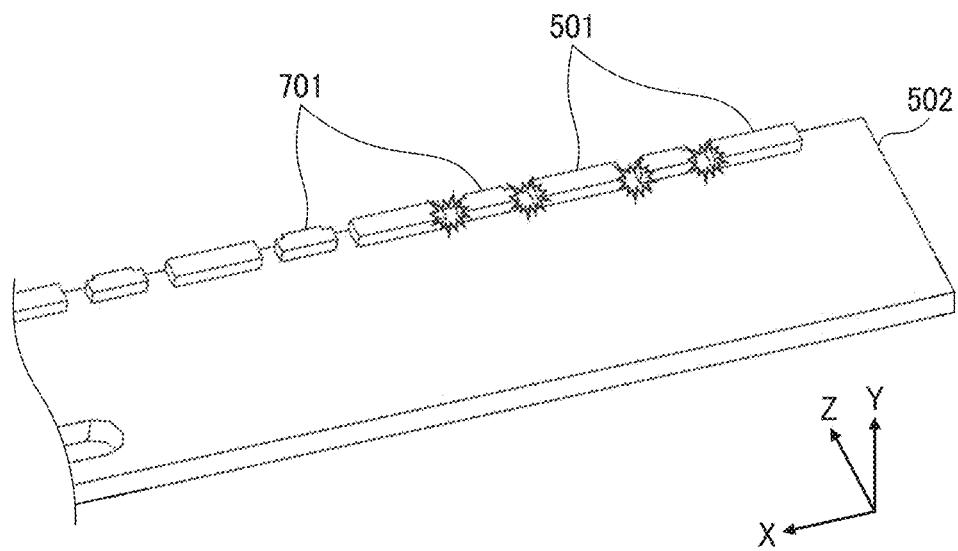
FIG. 9 is a diagram illustrating a defective condition in which a plurality of infrared-light point sources interfere with a plurality of white-point light sources on the edge side in the X-direction, according to an embodiment of the present disclosure.

However, in the present embodiment, as described above with reference to FIG. 6, the array pitch of the multiple white-point light sources 501 on the edge side in the X-direction is made narrower than the array pitch on the central side. For this reason, when the infrared-light point source 701 is arranged between each pair of the multiple white-point light sources 501 so as to be at the same position as the multiple white-point light sources 501 in the Z-direction, as illustrated in FIG. 9, the multiple infrared-light point sources 701 on the edge side in the X-direction may unintentionally contact and interfere with the multiple white-point light sources 501 due to, for example, the sizes of parts.

Figure 10:
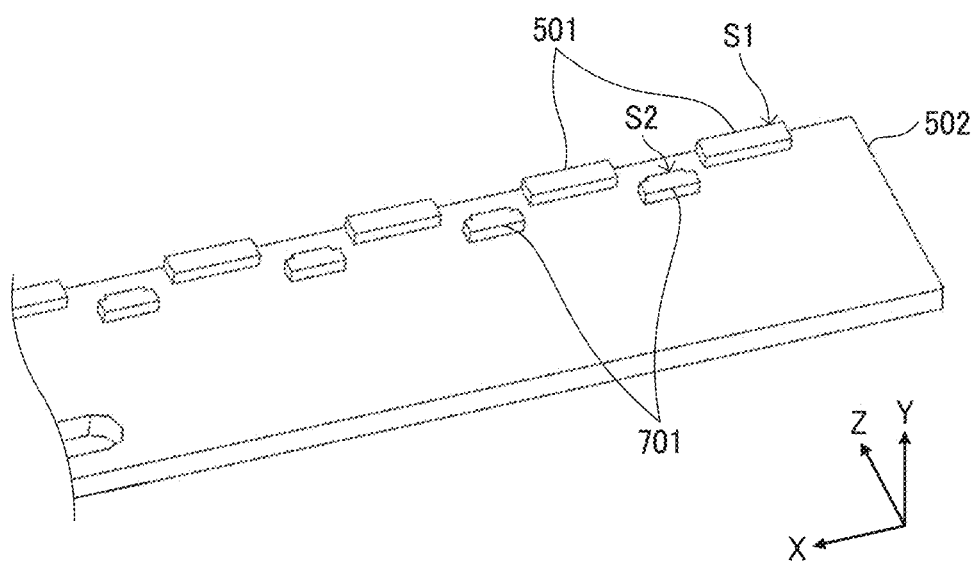
FIG. 10 is a diagram illustrating how the installed positions of a plurality of white-point light sources in a Z-direction and the installed positions of a plurality of infrared-light point sources in the Z-direction are differentiated from each other, according to an embodiment of the present disclosure.

FIG. 10 is a diagram illuminating the light emitting surfaces of the multiple infrared-light point sources 701 as illustrated in FIG. 8 disposed on an upstream side of the multiple white-point light sources 501 in an irradiation direction of the light, i.e., the +Z-direction, according to the present embodiment.

As illustrated in FIG. 10, the installed positions of the multiple white-point light sources 501 in a Z-direction and the installed positions of the multiple infrared-light point sources 701 in the Z-direction are differentiated from each other. Due to such a configuration, the multiple infrared-light point sources 701 can be prevented from touching or interfering with the multiple white-point light sources 501 on the edge side in the X-direction. Alternatively, the multiple white-point light sources 501 may be disposed on an upstream side of the multiple infrared-light point sources 701 in an irradiation direction of the light, i.e., the +Z-direction.

Figure 11:
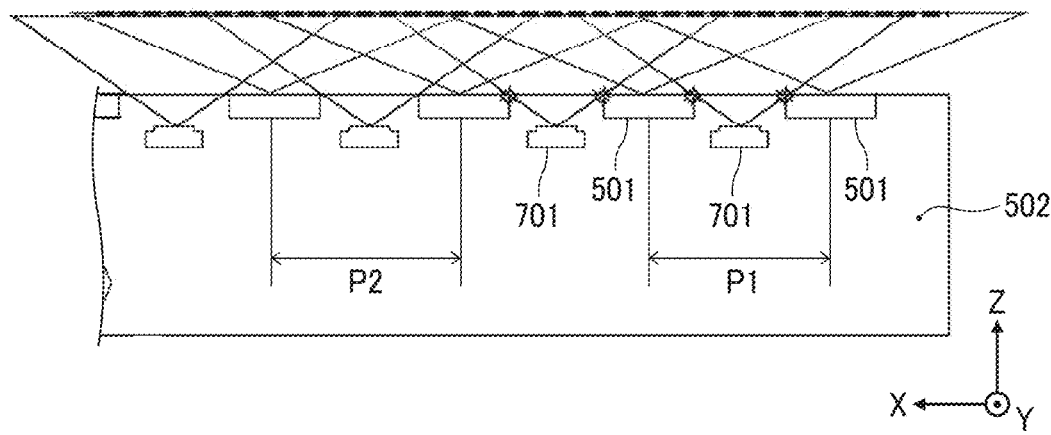
FIG. 11 is a diagram illustrating a defective condition in which some of the strong light within a half-value angle of a plurality of infrared-light point sources is blocked by some of a plurality of white-point light source, according to an embodiment of the present disclosure.

However, in the configuration or structure as illustrated in FIG. 10, as illustrated in FIG. 11, there is some concern that some of the light that is emitted from the multiple infrared-light point sources 701 disposed on an upstream side in an irradiation direction of the light, which serves as the second point sources of light, is blocked by, for example, the housing or case of the multiple white-point light sources 501 disposed on an downstream side in an irradiation direction of the light, which serves as the first point sources of light. Such blockage of light by the multiple white-point light sources 501 is caused depending on the relation between the array pitch of the multiple white-point light sources 501 and the directivity angle of the multiple infrared-light point sources 701, in particular, the half-value angle with which the radiation intensity of light from the center of the light emission becomes half. More specifically, the radiation intensity of the light that is blocked by the multiple white-point light sources 501 increases as the array pitch of the multiple white-point light sources 501 is narrower, and the radiation intensity of the light that is blocked by the multiple white-point light sources 501 increases as the half-value angle of the multiple infrared-light point sources 701 is wider. As illustrated in FIG. 11, strong light within the half-value angle is not blocked by any of the multiple white-point light sources 501 around the center of the multiple white-point light sources 501 in the X-direction where the array pitch of the multiple white-point light sources 501 is wide. However, on an edge side of the multiple white-point light sources 501 in the X-direction where the array pitch of the multiple white-point light sources 501 is narrow, strong light within the half-value angle tends to be blocked by some of the multiple white-point light sources 501, and the amount of blocked light increases.

As described above, some of the strong light within the half-value angle that is emitted from the multiple infrared-light point sources 701 is unintentionally blocked by the multiple white-point light sources 501 disposed on an downstream side in an irradiation direction of the light on an edge side of the multiple infrared-light point sources 701 in the X-direction. Due to such a configuration, the utilization efficiency of the light emitted from the multiple infrared-light point sources 701 on the edge side in the X-direction significantly deteriorates, and the radiation intensity of the light that is incident on the light guide 503 (see FIG. 5) tend to deteriorate significantly.

Figure 12:
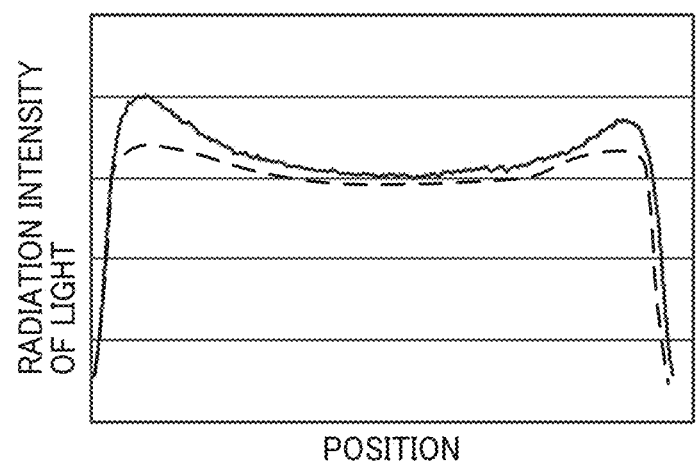
FIG. 12 is a diagram illustrating an optimal distribution of radiation intensity of light as well as the distribution of radiation intensity of light at a scanning position of the multiple infrared-light point sources in the main scanning direction, i.e., the X-direction, in the configuration as illustrated in FIG. 11.

FIG. 12 is a diagram illustrating an optimal distribution of radiation intensity of light as well as the distribution of radiation intensity of light at a scanning position of the multiple infrared-light point sources 701 in the main scanning direction, i.e., the X-direction, in the configuration as illustrated in FIG. 11.

The broken line in FIG. 12 indicates the distribution of radiation intensity of light of the multiple infrared-light point sources 701, and the solid line in FIG. 12 indicates an optimal distribution of radiation intensity of light. As some of the strong light within the half-value angle that is emitted from the multiple infrared-light point sources 701 are blocked by the multiple white-point light sources 501 on the edge side in the X-direction, the radiation intensity of the light that is incident on the light guide 503 on the edge side in the X-direction tend to be reduced. As a result, as indicated by the broken line in FIG. 12, the radiation intensity of light on an edge side of the document plane in the X-direction tends to be smaller than optimal radiation intensity of light. Due to such a configuration, reduction in the radiation intensity of light when the light passes through the first lens group 403 and the second lens group 404 cannot be compensated, and the radiation intensity of the light that is incident on the image sensor 405 on the edge side in the X-direction tends to be reduced. As a result, there is some concern that the document image on the edge side in the X-direction cannot be scanned or read as desired. In other words, there is some concern that the quality of the image that is formed based on data of the image that is scanned by irradiation of light using the multiple infrared-light point sources 701 deteriorates.

In order to avoid such situation, in the present embodiment, a plurality of infrared-light point sources whose half-value angle is smaller than the half-value angle of the multiple white-point light sources 501 are used as a plurality of infrared-light point sources disposed on an upstream side of the multiple white-point light sources 501 in an irradiation direction of the light, i.e., the +Z-direction.

Figure 13:
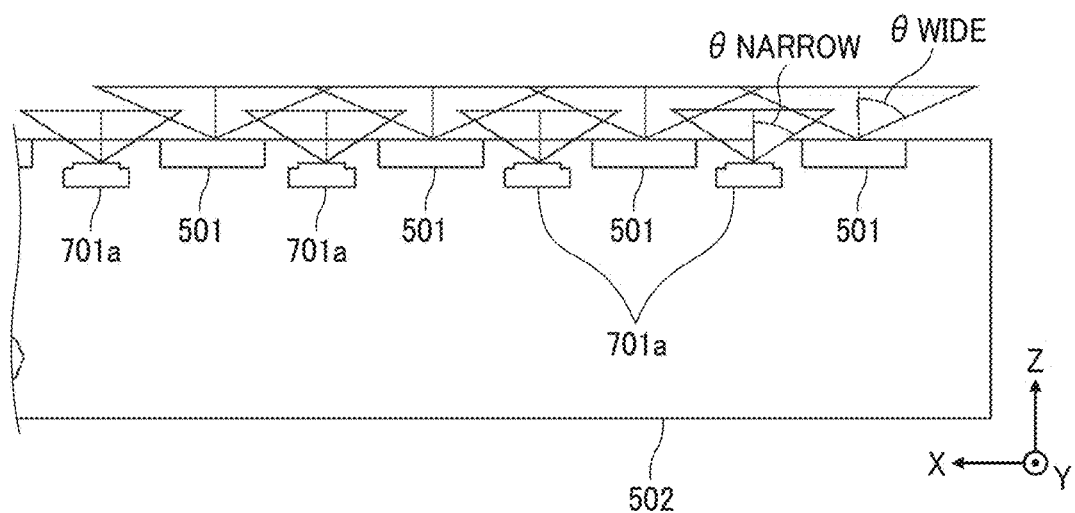
FIG. 13 is a diagram illustrating a case in which a plurality of infrared-light point sources whose half-value angle in the X-direction is smaller than that of a plurality of white-point light sources, according to an embodiment of the present disclosure.

FIG. 13 is a diagram illustrating an arrangement in which the multiple infrared-light point sources 701a whose half-value angle is smaller than the half-value angle of the multiple white-point light sources 501 are used, according to the present embodiment.

As illustrated in FIG. 13, the multiple infrared-light point sources 701a whose half-value angle is smaller than the half-value angle of the multiple white-point light sources 501 are used as a plurality of infrared-light point sources disposed on an upstream side of the multiple white-point light sources 501 in an irradiation direction of the light, i.e., the +Z-direction. Due to such a configuration, blockage of some of the strong light within the half-value angle that is emitted from the multiple infrared-light point sources 701 by the multiple white-point light sources 501 can efficiently be controlled compared with cases in which the half-value angle of a plurality of infrared-light point sources is equal to or wider than the half-value angle of the multiple white-point light sources 501. Due to such a configuration, the radiation intensity of light on the edge side in the X-direction can be prevented from decreasing, and the image of a document can be scanned and read as desired by the light emitted from the multiple infrared-light point sources 701. As a result, deterioration of the quality of the image that is copied based on the data of the read image can effectively be prevented.

As the half-value angle of a plurality of infrared-light point sources in the X-direction is reduced, the irradiation field of the infrared light that is emitted from a plurality of infrared-light point sources in the X-directions tends to get narrow. However, in the present embodiment, diffusing agent is applied to the exit plane 503a of the light guide 503 as described as above, and the light that is emitted from the light guide 503 diverges when traveling to the document plane. Due to such a configuration, even if the irradiation field of the infrared light that is emitted from a plurality of infrared-light point sources in the X-directions is slightly narrow, the document plane can be irradiated with infrared light evenly in the main scanning direction without reduction in radiation intensity of light between each pair of the point sources of light in the main scanning direction of the document plane. Assuming that none of the light within the half-value angle of a plurality of infrared-light point sources is blocked and the multiple infrared-light point sources do not touch or interfere with the white-point light sources, the positions of the light emitting surfaces of the multiple white-point light sources in the Z-directions may be the same as the positions of the multiple light emitting surfaces of the multiple infrared-light point sources.

A half-value angle is described below in detail.

Figure 14:
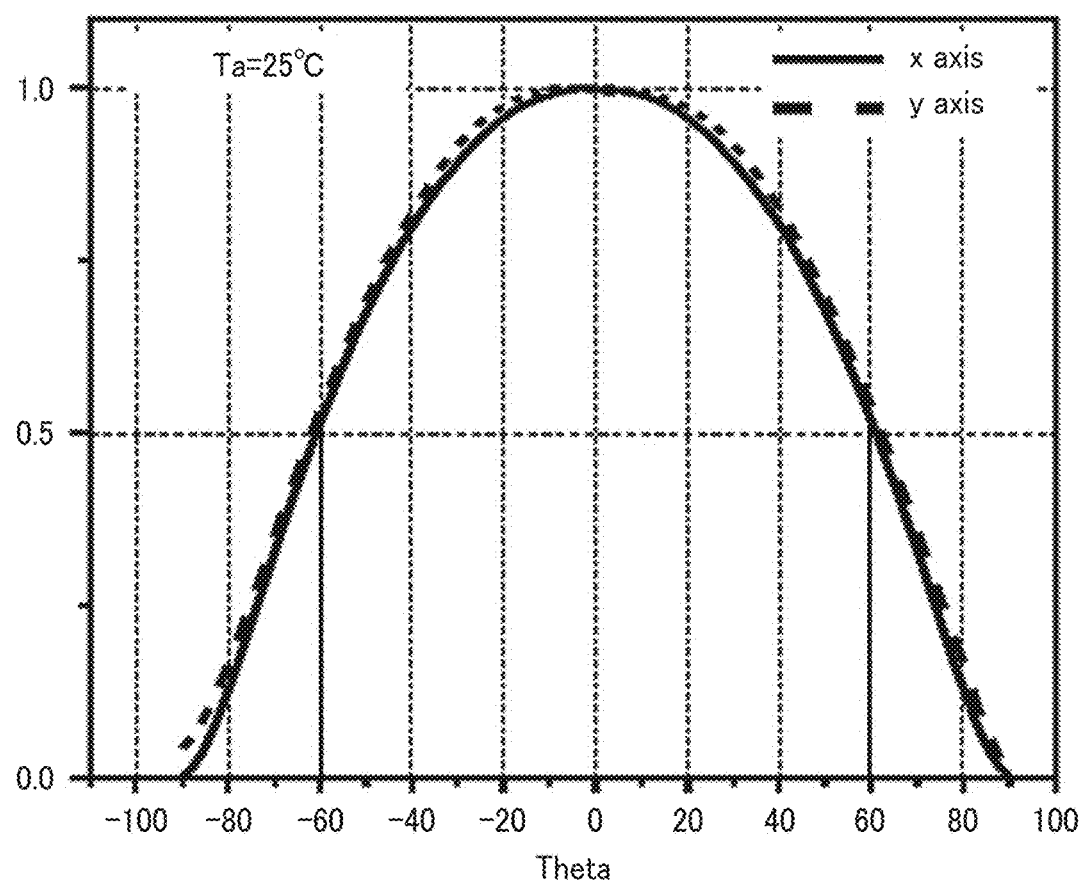
FIG. 14 is a diagram illustrating the directivity of a point source of light, according to an embodiment of the present disclosure.

FIG. 14 is a diagram illustrating the directivity of a point source of light, according to the present embodiment.

The solid line in FIG. 14 indicates the directivity in the X-direction (see FIG. 13), i.e., the longer-side directions of the circuit board, and the broken line in FIG. 14 indicates the directivity in the Y-direction (see FIG. 13), i.e., the thickness directions of the circuit board.

As illustrated in FIG. 14, as the directivity angle of light irradiation increases, the radiation intensity of light decreases. Note that the half-value angle indicates a directivity angle with which the radiation intensity of light is reduced to half of the maximum radiation intensity of light, i.e., the radiation intensity of light when the directivity angle is 0 degree. In the example as illustrated in FIG. 14, both the half-value angle in the X-direction and the half-value angle in the Y-direction are 60 degrees.

Figure 15A:
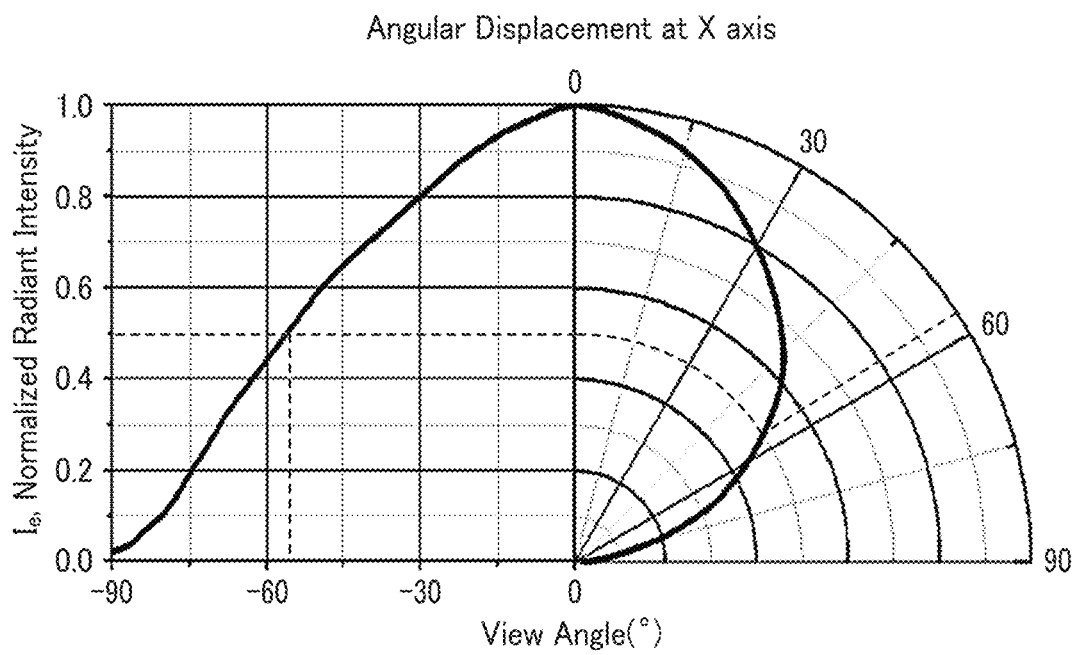
FIG. 15A and FIG. 15B are diagrams each illustrating point sources of light in which the half-value angle in the X-direction has a directivity different from that of the half-value angle in the Y-direction, according to an embodiment of the present disclosure.
Figure 15B:
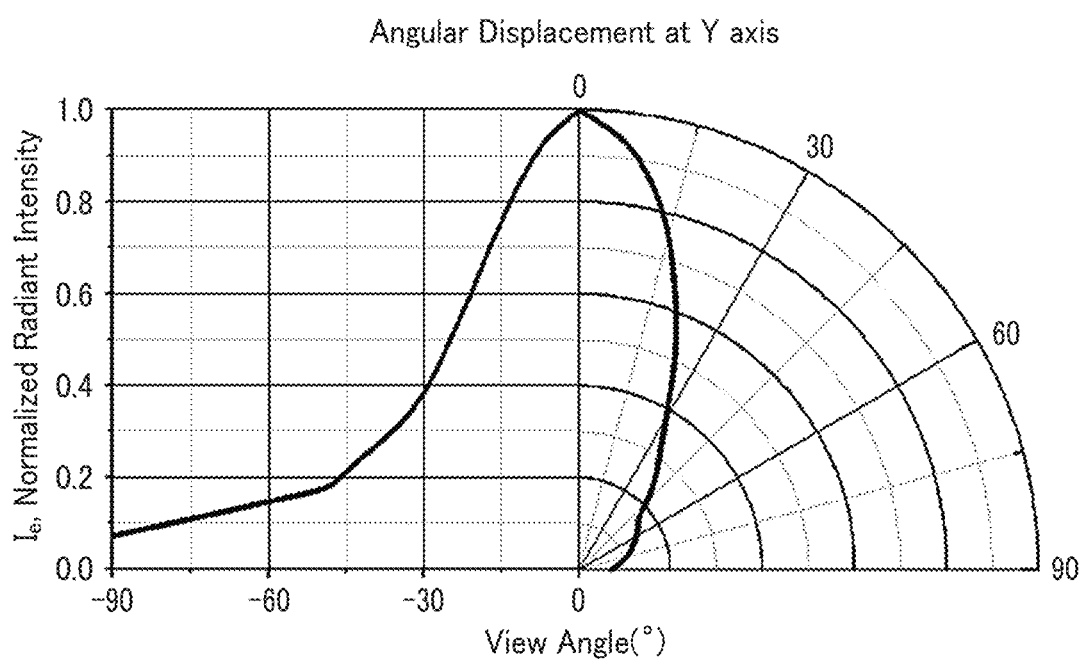

Some point sources of light are known in the art in which the half-value angle in the X-direction (see FIG. 13), i.e., the longer-side directions of the circuit board as illustrated in FIG. 15A, has a directivity different from that of the half-value angle in the Y-direction (see FIG. 13), i.e., the thickness directions of the circuit board as illustrated in FIG. 15B.

Figure 16:
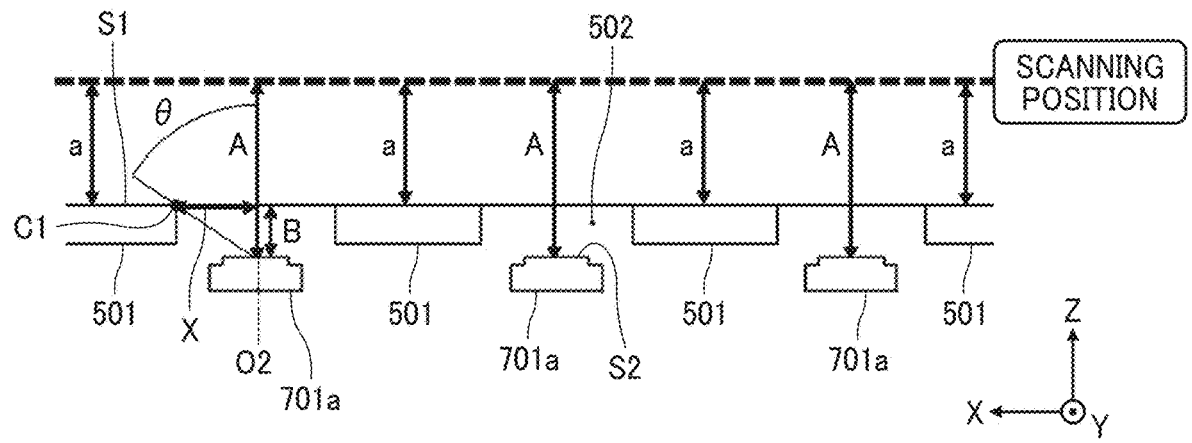
FIG. 16 is a diagram illustrating the relative positions of a plurality of white-point light sources and a plurality of infrared-light point sources, according to an embodiment of the present disclosure.

FIG. 16 is a diagram illustrating the relative positions of the multiple white-point light sources 501 and the multiple infrared-light point sources 701, according to the present embodiment.

As depicted in FIG. 16, the light emitting surfaces S1 of the multiple white-point light sources 501 and the edge face of the circuit board 502 are arranged on the same plane in a coplanar manner, and the distance between the light emitting surfaces S1 and the scanning position is made equal to the distance between the edge face of the circuit board 502 and the scanning position. As the multiple white-point light sources 501 and the edge face of the circuit board 502 are arranged on the same plane in a coplanar manner as described above, the light with directivity in the Y-direction can be made incident on the light guide 503 without being blocked by the circuit board 502, and the utilization efficiency of light of the multiple white-point light sources 501 can be improved.

Moreover, the multiple white-point light sources 501 according to the present embodiment are arranged in a straight line in the X-direction, and a plurality of distances a between the light emitting surfaces S1 of the multiple white-point light sources 501 and the scanning position are equal to each other. Due to such a configuration, the distribution of radiation intensity of light on the document plane in the X-directions (see FIG. 7) can substantially be controlled based on a single factor, i.e., the array pitch of the multiple white-point light sources, and the distribution of radiation intensity of light on the document plane in the X-directions can easily be controlled to a desired distribution of radiation intensity of light.

In the present embodiment, it is desired that the multiple infrared-light point sources 701a be arranged on the circuit board 502 to satisfy a relation in the following formula.

$$B \leq X/\tan \theta$$

In the above formula, B denotes the distance between a plurality of light emitting surfaces S2 of the multiple infrared-light point sources 701a and the light emitting surface S1 of the neighboring one of the multiple white-point light sources 501, and θ denotes the half-value angle of the multiple infrared-light point sources 701a. Moreover, in the above formula, X denotes the distance between a center of light emission O2 of the multiple infrared-light point sources 701a and one side C1 of the light emitting surface S1 of the neighboring one of the multiple white-point light sources 501.

Due to such a configuration, all the strong light within the half-value angle of the multiple infrared-light point sources 701a in the X-direction can be made incident on the light guide 503, and the radiation intensity of light can be prevented from decreasing as desired.

In the present embodiment, the multiple infrared-light point sources 701a are arranged in a straight line in the X-direction, and a plurality of distances A between the light emitting surfaces S2 of the multiple infrared-light point sources 701a and the scanning position are equal to each other. Due to such a configuration, the distribution of radiation intensity of light on the document plane in the X-directions can easily be controlled to a desired distribution of radiation intensity of light.

While the multiple infrared-light point sources 701a on the edge side in the X-direction that tend to touch or interfere with the multiple white-point light sources 501 when arranged at the same position as the multiple white-point light sources 501 may be disposed on an upstream side of the multiple white-point light sources 501 in an irradiation direction of the light, i.e., the +Z-direction (a<A), the multiple infrared-light point sources 701 on the central side may be arranged at the same position as the multiple white-point light sources 501 in the Z-direction (a=A). Due to such a configuration, the light with directivity in the Y-direction on the central side can be made incident on the light guide 503 without being blocked by the circuit board 502, and the utilization efficiency of light on the central side can be improved.

Figure 17:
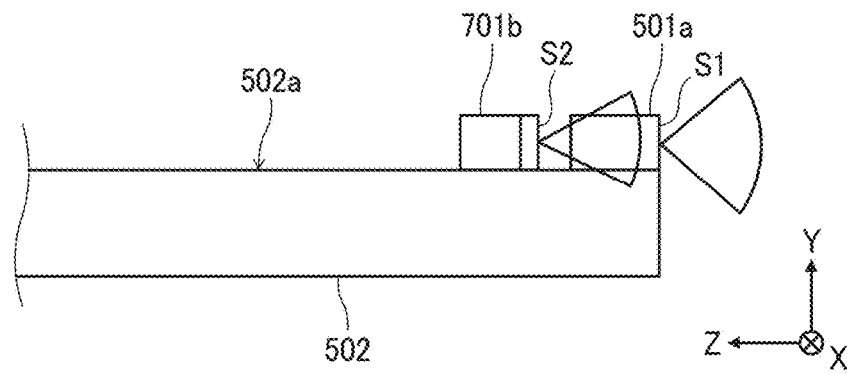
FIG. 17 is a diagram illustrating a circuit board viewed from an X-direction, according to an embodiment of the present disclosure.

FIG. 17 is a diagram illustrating the circuit board 502 of FIG. 16 viewed from an X-direction, according to the present embodiment.

As illustrated in FIG. 17, a plurality of infrared-light point sources whose half-value angle in the Y-direction is smaller than the half-value angle of the multiple white-point light sources 501 in the Y-direction are preferably used. The multiple white-point light sources and the multiple infrared-light point sources according to the present embodiment are light-emitting diodes (LEDs) of side-view type, and the light emitting surfaces S1 and the light emitting surfaces S2 are implemented on the circuit board 502 so as to be orthogonal to the implementation surface 502a. As understood from FIG. 15A and FIG. 15B, in regard to the multiple white-point light sources 501 whose light emitting surfaces are arranged on the same plane as the edge face of the circuit board 502 in a coplanar manner, the light with directivity in the Y-direction are made incident on the light guide 503 without being blocked by the circuit board 502. By contrast, in regard to a plurality of infrared-light point sources that are arranged at positions further from the end face of the circuit board 502 than the multiple white-point light sources 501, some of the light with directivity in the Y-direction tends to be blocked by the circuit board 502. As the half-value angle in the Y-direction is wider, a greater amount of strong light tends to be blocked by the circuit board 502, and the utilization efficiency of light significantly deteriorates. As illustrated in FIG. 15A and FIG. 15B, a plurality of infrared-light point sources 701b whose half-value angle in the Y-direction is smaller than the half-value angle of the multiple white-point light sources 501 in the Y-direction are preferably used as a plurality of infrared-light point sources. Due to the adoption of such a configuration as described above, strong light within the half-value angle can be prevented from being blocked by the circuit board 502 as desired, and the utilization efficiency of light in the Y-direction can be improved as desired.

In the above description of the embodiment of the present disclosure, cases in which the illuminating device according to the embodiment of the present disclosure is applied to an image scanning unit that reads an image of a document using an integral scanning unit are described. However, no limitation is indicated thereby, and the illuminating device according to the present embodiment may be used for an image scanning unit with differential mirrors.

Figure 18:
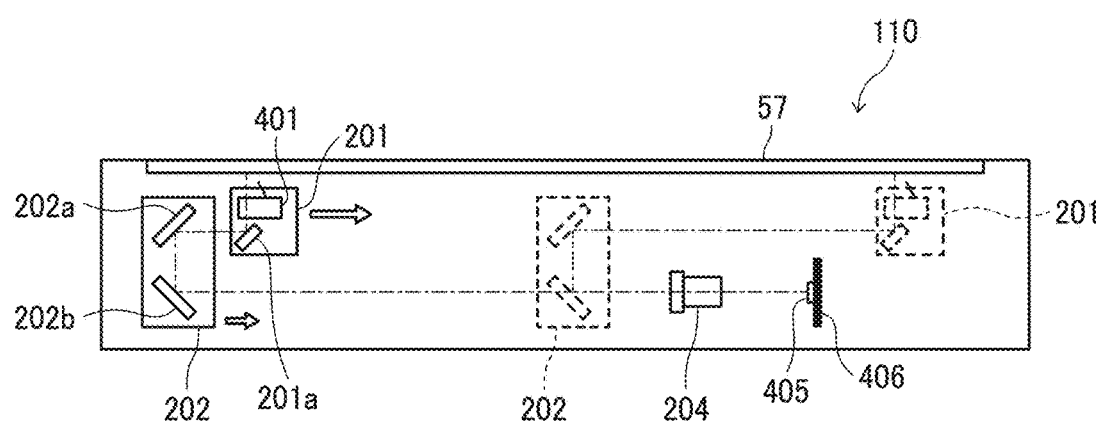
FIG. 18 is a schematic diagram illustrating a scanner unit of an image scanning unit with differential mirrors, according to an embodiment of the present disclosure.

FIG. 18 is a schematic diagram illustrating a scanner unit 110 of an image scanning unit with differential mirrors, according to the present embodiment. As illustrated in FIG. 18, the scanner unit 110 of the image scanning unit with differential mirrors includes a first carriage 201 and a second carriage 202. The first carriage 201 includes the illuminating device 401 and a first mirror 201a, and the second carriage 202 includes a second mirror 202a and a third mirror 202b.

Once the image reading or scanning starts, the document placed on the contact glass 57 is irradiated with light by the illuminating device 401, and the first carriage 201 is moved from the left side to the right side in FIG. 18. Further, the second carriage 202 is moved to the right side in FIG. 18 at the half speed of the first carriage 201. As described above, the second carriage 202 is moved to the same direction as the first carriage 201 at the half speed of the first carriage 201. Due to such a configuration, the optical-path length of the light flux between the document plane and an imaging lens 204 can be maintained at a constant degree.

In the course of the process of moving the first carriage 201 and the second carriage 202 from the left side to the right side in FIG. 18 at the velocity ratio of 2:1, the light that is emitted from the illuminating device 401 is reflected by the document placed on the contact glass 57. The light reflected by the document is guided to the imaging lens 204 as reflected by the first mirror 201a, the second mirror 202a, and the third mirror 202b, and is formed on the image sensor 405. As a result, the image of the document is scanned and obtained.

As the illuminating device according to the present embodiment is used for an image scanning unit with differential mirrors, the utilization efficiency of light of the multiple second point sources of light, which is one of the two kinds of point sources of light in which the distances between the light emitting surfaces (S1, S2) and the scanning position are further than the other one of the two kinds of point sources of light, can be prevented from deteriorating, and the image of a document can be read as desired using the second point sources of light.

In the above description of the embodiment of the present disclosure, cases in which a plurality of infrared-light point sources are disposed on an upstream side of the multiple white-point light sources 501 in an irradiation direction of the light, i.e., the +Z-direction are described. However, these elements may be arranged on the other way around. When the elements are arranged on the other way around, a plurality of white-point light sources whose half-value angle is smaller than the half-value angle of a plurality of infrared-light point sources are used. In the above-described embodiment of the present disclosure, the combination of a plurality of white-point light sources and a plurality of infrared-light point sources is described as an example combination of two kinds of light sources whose distances between the light emitting surfaces and the scanning position are different from each other. However, no limitation is indicated thereby, and for example, a combination of a plurality of white-point light sources that emit visible light and a plurality of ultraviolet light point sources that emit invisible ultraviolet light, or a combination of a point source of light that emits red light and a point source of light that emits blue light may be adopted. Alternatively, a combination of two kinds of point sources of light whose wavebands are equivalent to each other and half-value angles are different from each other may be adopted.

The illuminating device according to the above embodiments of the present disclosure may be applied to other devices or apparatuses other than the image scanning unit.

The embodiments described above are given as an example, and unique advantageous effects are achieved for each of the first to fourteenth modes given below.

First Mode

An illuminating device includes a plurality of first light sources such as a plurality of white-point light sources 501 arrayed on a circuit board, and a plurality of second light sources such as a plurality of infrared-light point sources 701 disposed on an upstream side of the multiple first light sources in an irradiation direction of the light. In the illuminating device according to the present mode of the present disclosure, the directivity angle of the multiple second light sources is different from the directivity angle of the multiple first light sources. Due to such a configuration, the directivity angle of the multiple second light sources such as the multiple infrared-light point sources 701 can be made different from the directivity angle of the multiple first light sources such as the multiple white-point light sources 501, and the directivity angle of the multiple second light sources can be made smaller than the directivity angle of the multiple first light sources. Accordingly, compared with cases in which the directivity angle of the multiple second light sources is equal to or wider than the directivity angle of the multiple first light sources, the light that is emitted from the multiple second light sources can be prevented from being blocked by the multiple first light sources, and the utilization efficiency of light of the multiple second light sources can be prevented from deteriorating.

Second Mode

In the first mode of the present disclosure as described above, the directivity angle of the multiple second light sources such as the multiple infrared-light point sources 701 is smaller than the directivity angle of the multiple first light sources such as the multiple white-point light sources 501. Due to such a configuration, as described above in the embodiment of the present disclosure, compared with cases in which the directivity angle of the multiple second light sources is equal to or wider than the directivity angle of the multiple first light sources, the light that is emitted from the multiple second light sources can be prevented from being blocked by the multiple first light sources, and the utilization efficiency of light of the multiple light sources can be prevented from deteriorating.

Third Mode

An illuminating device includes a plurality of first light sources such as a plurality of white-point light sources 501 arrayed on a circuit board, and a plurality of second light sources such as the multiple infrared-light point sources 701 that have a narrower directivity angle than the multiple first light sources. In the third mode of the present disclosure, a relation in the following formula is satisfied.

$$a \leq A$$

In the above formula, a denotes a distance between an object and a plurality of first light emitting surfaces of the multiple first light sources, and A denotes a distance between the object and the multiple second light emitting surfaces of the multiple second light sources.

Due to such a configuration, as described above in the embodiment of the present disclosure, the utilization efficiency of light of the multiple light sources can be prevented from deteriorating compared with a configuration in which the distance a between an object such as a document and the multiple first light emitting surfaces of the multiple first light sources is made longer than the distance A between the object and the multiple second light emitting surfaces of the multiple second light sources.

Fourth Mode

In the illuminating device 401 according to any one of the first mode to the third mode of the present disclosure, the directivity angle is a half-value angle.

Fifth Mode

In the illuminating device 401 according to any one of the first to fourth modes of the present disclosure, one of the multiple second light sources such as the multiple infrared-light point sources 701 is disposed between a pair of the multiple first light sources such as the such as the multiple white-point light sources 501 in a longer-side direction of the circuit board 502. When the illuminating device 401 is viewed from a light-source mount surface of the circuit board in a vertical direction, a relation in the following formula is satisfied.

$$B \leq X/\tan \theta$$

In the above formula, B denotes the distance between one of the multiple light emitting surface of the multiple second light sources and neighboring one of the multiple first light emitting surfaces of the multiple first light sources in the longer-side direction, and θ denotes a half-value angle of the multiple first light sources. Moreover, in the above formula, X denotes the distance between the center of light emission O2 of one of the multiple second light sources and an edge of neighboring one of the multiple first light emitting surfaces of the multiple first light sources on said one of the second light sources side.

Due to such a configuration, as described above with reference to FIG. 16, strong light within the half-value angle of the multiple second light sources is no longer blocked by the multiple first light sources, and the utilization efficiency of light of the multiple second light sources can be prevented from deteriorating as desired.

Sixth Mode

In the illuminating device 401 according to any one of the first to fifth modes, the directivity angle is equivalent to the half-value angle in the longer-side directions of the circuit board, i.e., the X-directions in the present embodiment. Due to such a configuration, as described above in the embodiment of the present disclosure, the utilization efficiency of light of the multiple second light sources in the longer-side directions of the circuit board such as the X-directions can be prevented from deteriorating.

Seventh Mode

In the illuminating device 401 according to any one of the first to sixth modes of the present disclosure, the light emitting surfaces S1 and the light emitting surfaces S2 of a plurality of first light sources such as the multiple white-point light sources 501 and a plurality of second light sources such as the multiple infrared-light point sources 701 are vertical to the light-source mount surface such as the implementation surface 502a of the circuit board.

Eighth Mode

In the illuminating device 401 according to the seventh mode of the present disclosure, a half-value angle of the multiple second light sources in a vertical direction to the light-source mount surface of the circuit board is narrower than a half-value angle of the multiple first light sources in the vertical direction. In the above embodiment of the present disclosure, the vertical direction to the light-source mount surface of the circuit board corresponds to the Y-direction. Due to such a configuration, as described above with reference to FIG. 17, the light that is emitted from the multiple second light sources within the half-value angle in a vertical direction to the light-source mount surface can be prevented from being blocked by the circuit board 502, and the utilization efficiency of light of the multiple second light sources in a vertical direction to the light-source mount surface can be prevented from deteriorating.

Ninth Mode

In the illuminating device 401 according to the seventh mode or the eighth mode of the present disclosure, the multiple first light sources are arranged such that a plurality of light emitting surfaces S1 of the multiple first light sources, i.e., the multiple white-point light sources 501, will be on the same plane as the edge face of the circuit board 502 in a coplanar manner. Due to such a configuration, the light that is emitted from the multiple first light sources such as the multiple white-point light sources 501 can be prevented from being blocked by the circuit board, and the utilization efficiency of light of the multiple first light sources can be prevented from deteriorating.

Tenth Mode

In the illuminating device 401 according to any one of the first to ninth modes, the array pitch of the multiple first light sources such as the multiple white-point light sources 501 on an edge side of the circuit board in a longer-side direction (i.e., the X-directions in the present embodiment) is made narrower than an array pitch of the multiple first light sources on a central side of the circuit board in the longer-side direction. Due to such a configuration, the radiation intensity of light at the irradiation position such as a scanning position on an edge side of the circuit board 502 in the longer-side direction, i.e., the X-directions in the present embodiment can be increased to a degree greater than that on the central side. Due to such a configuration, the reduction in radiation intensity of the light that passes through an optical lens such as an imaging lens, through which the light that is reflected by the projection plane such as the surface of a document passes, on the edge side in the X-direction can be compensated, and the reflection light can be made incident on the image sensor 405 evenly in the main scanning direction.

Eleventh Mode

In the illuminating device 401 according to any one of the first to tenth modes of the present disclosure, the multiple first light sources such as the such as the multiple white-point light sources 501 are a plurality of infrared light source when the multiple second light sources are a plurality of white light sources, and the multiple first light sources are a plurality of white light sources when the multiple second light source are a plurality of infrared light sources. Due to such a configuration, as described above in the embodiment of the present disclosure, the projection plane such as the surface of a document can be irradiated with both white light and infrared light.

Twelfth Mode

In the illuminating device 401 according to any one of the first to eleventh modes of the present disclosure, a plurality of light emitting surfaces of a plurality of first light sources such as the multiple white-point light sources 501 are disposed in a straight line. Due to such a configuration, as described above in the embodiment of the present disclosure, the distance between the irradiation position and the multiple light emitting surfaces can be kept at a constant degree, and the radiation intensity of the light that is emitted from the multiple first light sources to the projection plane can be kept at a constant degree. Due to such a configuration, the distribution of radiation intensity of light in the main scanning direction can be controlled to a predetermined distribution of radiation intensity of light based on a simple adjustment on the array pitch of the multiple first light sources.

Thirteenth Mode

An image reading device such as the image scanning unit 130 includes the illuminating device according to any one of the first to twelfth modes of the present disclosure, and an imaging device such as the image sensor 405 that receives the light reflected by a document to capture an image of the document. In the thirteenth mode of the present disclosure, the illuminating device 401 irradiates a document with light. Due to such a configuration, the quality of the image that is scanned by irradiation of light using the multiple second light sources can be improved.

Fourteenth Mode

In the fourteenth mode of the present disclosure, the image reading device is configured to read an image on a document, and an image is formed on a recording material based on data of the image read by the image reading device. An image forming apparatus includes the image reading device according to the twelfth mode of the present disclosure. Due to such a configuration, the quality of the image that is formed on a recording material based on data of the image that is scanned by irradiation of light using the multiple second light sources can be improved.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims. For example, some of the elements described in the above embodiments may be removed. Further, elements according to varying embodiments or modifications may be combined as appropriate.

This patent application is based on and claims priority to Japanese Patent Application No. 2020-056146, filed on Mar. 26, 2020, in the Japan Patent Office, the entire disclosure of which is hereby incorporated by reference herein.

REFERENCE SIGNS LIST

1 Copier
10 Scanner unit
10a Housing
10b Scanner cover
57 Contact glass
58 Slit glass 100 Printer unit
110 Scanner unit
120 Automatic document feeder
130 Image reading device
200 Integral scanning unit
401 Illuminating device
402a to 402e Reflection mirror
403 First lens group
404 Second lens group
405 Image sensor
406 Drive circuit board
407 Lens band
408 Frame
409 Lens holder
410 Fixing bracket
413 Lens fixing bracket
414 Document
501 White-point light source
502 Circuit board
502a Implementation surface
503 Light guide
503a Exit plane
701 Infrared-light point source
701a Infrared-light point source
701b Infrared-light point source
A Distance between scanning position and light emitting surface of infrared-light point source
B Distance between light emitting surface of infrared-light point source and light emitting surface of white-point light source
G Moving direction of integral scanning unit
O2 Center of light emission of infrared-light point source
P Transfer paper
P1 Array pitch on central side in X-direction
P2 Array pitch on edge side in X-direction
S1 Light emitting surface of white-point light source
S2 Light emitting surface of infrared-light point source
X Distance between center of light emission of infrared-light point source one side of light emitting surface of neighboring one of multiple white-point light sources
a Distance between scanning position and light emitting surface of white-point light source
θ Half-value angle of infrared-light point source

The invention claimed is:

1. An illuminating device comprising:
a plurality of first light sources of a side-view type arrayed on a circuit board having an implementation surface, the plurality of first light sources having a plurality of first light emitting surfaces configured to emit light, the plurality of first light emitting surfaces being vertically on the implementation surface of the circuit board-; and
a second light source of the side-view type on an upstream side of the plurality of first light sources in an irradiation direction of the light, the second light source having a second light emitting surface configured to emit, the second light emitting surface being vertically on the implementation surface of the circuit board,
wherein the second light source has a directivity angle different from a directivity angle of each one of the plurality of first light sources.

2. The illuminating device according to claim 1, wherein the directivity angle of the second light source is narrower than the directivity angle of each one of the plurality of first light sources.

3. The illuminating device according to claim 1, wherein the second light source having the directivity angle smaller than the directivity angle of each one of the plurality of first light sources,
wherein a≤A is satisfied, wherein
a is a distance between an object and each one of the plurality of first light emitting surfaces of the plurality of first light sources, and
A is a distance between the object and the second light emitting surface of the second light source.

4. The illuminating device according to claim 1, wherein the directivity angle is a half-value angle.

5. The illuminating device according to claim 1, wherein the second light source is between a pair of the plurality of first light sources in a longer-side direction of the circuit board, and
based on the illuminating device being viewed from a light-source mount surface of the circuit board in a vertical direction,
B≤X / tan θ is satisfied, wherein
B is a distance between the second light emitting surface of the second light source and neighboring one of the plurality of first light emitting surfaces of the plurality of first light sources in the longer-side direction,
θ is a half-value angle of the second light source, and
X is a distance between a center of light emission of the second light source and an edge of the neighboring one of the plurality of first light emitting surfaces of the plurality of first light sources on a side of the second light source.

6. The illuminating device according to claim 1, wherein the directivity angle is a half-value angle in a longer-side direction of the circuit board.

7. The illuminating device according to claim 1, wherein the plurality of first light emitting surfaces of the plurality of first light sources and the second light emitting surface of the second light source are vertical to a light-source mount surface of the circuit board.

8. The illuminating device according to claim 7, wherein a half-value angle of the second light source in a vertical direction to the light-source mount surface of the circuit board is narrower than a half-value angle of each one of the plurality of first light sources in the vertical direction.

9. The illuminating device according to claim 7, wherein the plurality of first light emitting surfaces of the plurality of first light sources are coplanar to an edge face of the circuit board.

10. The illuminating device according to claim 1, wherein an array pitch of the plurality of first light sources on an edge side of the circuit board in a longer-side direction of the circuit board is narrower than an array pitch of the plurality of first light sources on a central side of the circuit board in the longer-side direction.

11. The illuminating device according to claim 1, wherein
the plurality of first light sources are a plurality of infrared light sources based on the second light source being a white light source, and
the plurality of first light sources are a plurality of white light sources based on the second light source being an infrared light source.

12. The illuminating device according to claim 1, wherein the plurality of first light emitting surfaces of the plurality of first light sources are disposed in a straight line.

13. An image reading device comprising:
the illuminating device according to claim 1; and
an imaging device configured to receive the light reflected by a document to capture an image of the document, wherein the illuminating device is configured to irradiate the document with light.

14. An image forming apparatus comprising:

the image reading device according to claim 13, the image reading device being configured to read an image on a document; and an image forming device configured to form an image on a recording material based on data of the image read by the image reading device.

* * * * *